United States Patent [19]

Linderfelt

[11] Patent Number: 4,914,915
[45] Date of Patent: Apr. 10, 1990

[54] WAVE POWERED TURBINE

[76] Inventor: Hal R. Linderfelt, 5540-A Avenida Soseiga, Laguna Hills, Calif. 92653

[21] Appl. No.: 368,772

[22] Filed: Jun. 20, 1989

[51] Int. Cl.⁴ ............................................. F03B 13/12
[52] U.S. Cl. ......................................... 60/502; 60/497
[58] Field of Search ................................... 60/497–507

[56] References Cited

U.S. PATENT DOCUMENTS 4,359,868 11/1982 Slonim .............................. 60/497 X
4,413,956 11/1983 Berg .................................. 60/497 X Primary Examiner—Allen M. Ostrager
Attorney, Agent, or Firm—Herb Boswell

[57] ABSTRACT

A turbine device for harvesting wave energy has a hollow vertical tube having an open top and a closed bottom. The vertical tube is located in a body of water with its bottom located beneath the surface of the body of water and its top located above the surface of the water. A hollow turbine tube having an open top and an open bottom is sized and shaped with respect to the vertical tube such that a variable portion of the turbine tube including its open bottom is located in and is movable within the vertical tube. A float for raising and lowering the turbine tube with respect to the vertical tube in response to wave motion is attached near the top of the turbine tube. Raising and lowering of the float in response to wave motion raises and lowers the turbine tube in the vertical tube. A liquid is contained in and is displaceable between the vertical tube and the lower portion of the turbine tube. A turbine which can be rotated in response to relative movement with respect to a fluid is located in and connected to the turbine tube in a position below the level of the liquid in the turbine tube. The turbine is moved through the liquid to rotate the turbine in response to movement of the turbine tube with respect to the vertical tube.

23 Claims, 3 Drawing Sheets

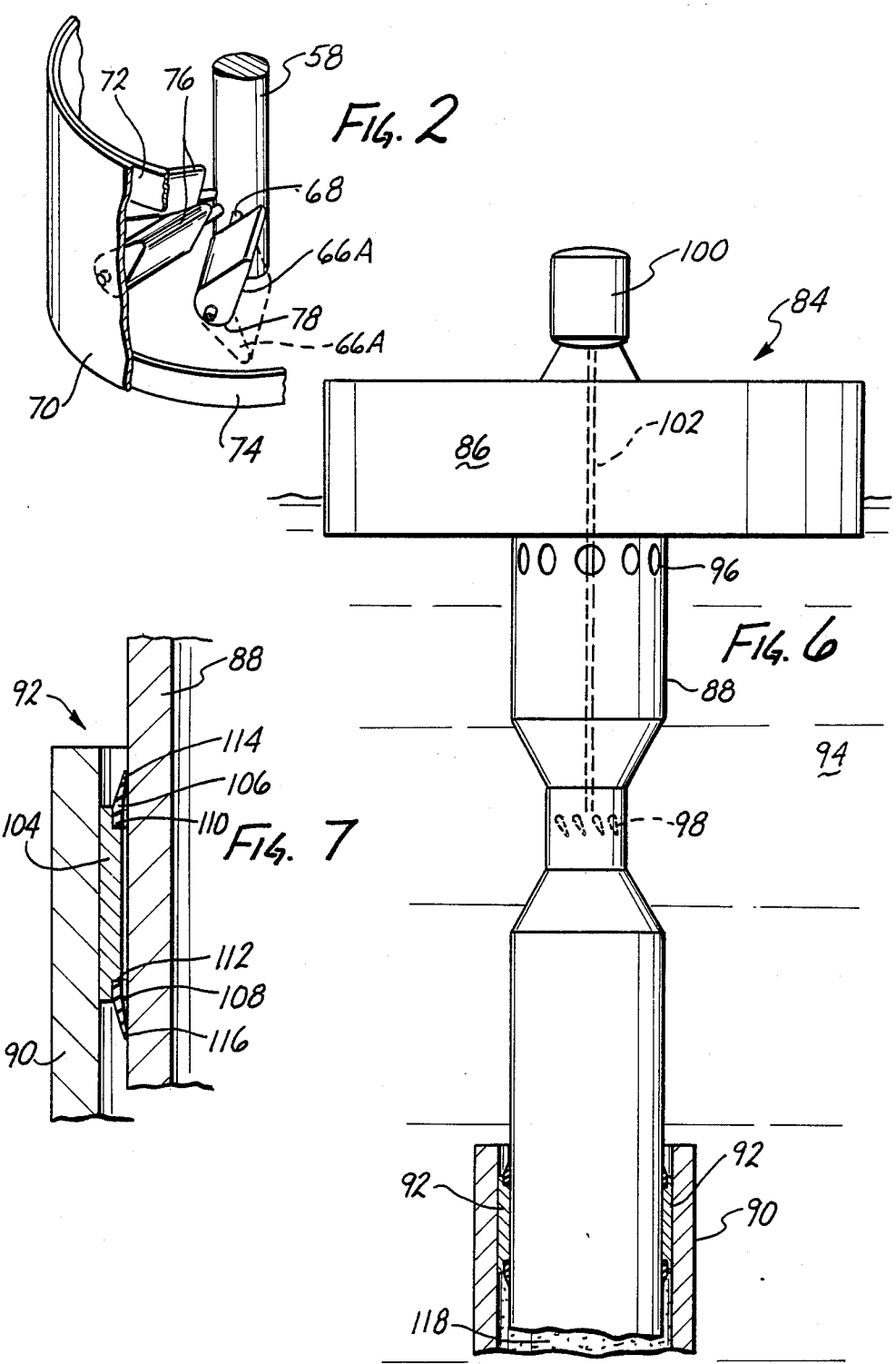

WAVE POWERED TURBINE

BACKGROUND OF INVENTION

This invention is directed to a wave harvesting device which moves a first tube through a second tube. The second tube is concentric with and contains the first tube. A turbine is located in and moves in conjunction with the first tube through a liquid contained in the second tube. A float powered by waves on the surface of a body of water moves the first tube through the second tube to cause rotation of the turbine as it moves through the liquid.

Various wave harvesting devices have been proposed over the last century. These range from very simple devices to extremely complex integrated systems representing huge engineering projects. For the most part little practical application of these wave harvesting devices has been achieved for various reasons.

In a prior United States Patent, U.S. Pat. No. 4,462,211, I describe a wave harvesting device for use off shore. The device of this patent utilizes surface waves to raise and lower a float. The float in turn is connected to counter rotating turbines. The connection between the float and the turbines is of sufficient length to position the turbines in still water located at a depth below that influenced by the surface waves. While this device certainly is very utilitarian it must be used in water of sufficient depth to isolate the turbines from wave motion and thus requires mooring and tethering in water of such depth.

Various devices have been proposed for harvesting wave energy close to shore, either along the shoreline, in shallow water or tethered to a pier, oil rig or the like. A recent demonstration device utilizes the ocean's surge to drive an air turbine. While this type of device might find practicality in those shore areas wherein there are rocky cliffs immediately adjacent a surging surf, as for instance, adjacent the North Sea, this type of device finds little practicality in those areas of the world wherein the shoreline consists of sloping sandy beaches or wherein the prevailing wave heights are insufficient to drive an air turbine.

With the amount of energy available in the waves of the world's oceans and lakes and with the necessity of modern civilizations to wean themselves from polluting energy sources, such as oil and other fossil fuels, it is evident that there still exists a large potential use for practical devices capable of harvesting wave energy.

BRIEF DESCRIPTION OF THE INVENTION

It is a broad object of this invention to provide a wave harvesting device which is capable of being utilized in shallow water close to shore or adjacent to the area wherein the energy will be utilized. It is a further object of this invention to provide a device which is capable of working both in bodies of water having energetic waves as well as bodies of water having less extreme wave conditions.

These and other objects as will become evident from the remainder of this specification are achieved in a device for harvesting wave energy which includes a first tube and a second tube. The second tube is concentric with and at least partially movably contained in the first tube with the second tube telescoping into and out of the first tube in response to movement of the second tube with respect to the first tube. A liquid is located in the first tube. A wave powered float is connected to the second tube for telescoping the second tube relative to the first tube. A turbine is attached to the second tube in a position within the first tube. The turbine is movable relative to the liquid in response to movement of the second tube relative to the first tube.

The device can further include a generator for generating an electrical current in response to rotation. The generator is located in association with the second tube. A transfer means for transferring rotational motion from the turbine to the generator is operatively connected between the turbine and the generator. The transfer means is rotated with respect to rotation of the turbine and in turn the transfer means rotates the generator.

The objects of the invention are further achieved in a device for harvesting wave energy which has a hollow vertical tube having an open top and a closed bottom. The vertical tube is located in a body of water with its bottom located beneath the surface of the body of water and its top located above the surface of the water. A hollow turbine tube having an open top and an open bottom is sized and shaped with respect to the vertical tube such that a variable portion of the turbine tube including its open bottom is located in and is movable within the vertical tube. A float for raising and lowering the turbine tube with respect to the vertical tube in response to wave motion is attached near the top of the turbine tube. Raising and lowering of the float in response to wave motion raises and lowers the turbine tube in the vertical tube. A liquid is contained in and is displaceable between the vertical tube and the lower portion of the turbine tube. Sufficient amount of liquid is present in the vertical tube to at least partially fill the interior of the vertical tube and at least partially fill the interior of the turbine tube with a portion of the liquid located between the outside of the turbine tube and the inside of the vertical tube, a further portion of the liquid located within the interior of the turbine tube above its open bottom and the remainder of the liquid located in the vertical tube below the open bottom of the turbine tube. A turbine which can be rotated in response to relative movement with respect to a fluid is located in and connected to the turbine tube in a position below the level of the liquid in the turbine tube. The turbine is moved through the liquid in response to movement of the turbine tube with respect to the vertical tube. Movement of the turbine through the liquid rotates the turbine.

The device may further include a float tube attached to the top of the turbine tube and sized and shaped to extend outwardly from and surround at least that portion of the vertical tube which extends above the surface of the body of the water. Additionally the float will preferably be shaped as a partially hollow toroid-like body which encircles the vertical tube and the turbine tube. Such a toroid-like float is attached to the float tube distal from the attachment of the float tube to the turbine tube.

Preferably both the vertical tube, the turbine tube and the float tube are formed as surfaces of rotation with the turbine tube telescoped in the vertical tube. Most preferred is a device wherein the vertical tube, turbine tube and float tube are round in cross section.

Preferably the gap between the turbine tube and the vertical tube, that is the cross sectional area of the area between the inside surface of the vertical tube and the outside surface of the turbine tube, is minimized to increase the efficiency of the device. Efficiency is increased by minimizing that portion of the stroke of the float which serves to raise or lower the level of the liquid located in this gap to a level sufficient to create a gap head, i.e. a pressure differential, for forcing liquid through the turbine.

The invention can further include a generator means for generating electrical current in response to rotation with the generator means located on top of the turbine tube. Also a transfer means for transferring rotational motion from the turbine means to the generator means is located within the turbine tube to operatively connect the turbine means to the generator means for transferring rotational motion of the turbine means to the generator means.

The wave harvesting device of the invention can be augmented by utilizing an external tube located in the body of water and sized and shaped to at least partially contain and protect the vertical tube, the turbine tube and the float means from horizontal wave motion. The external tube would include a top located above the surface of the water and a sub surface opening located below the surface of the water. The sub-surface opening serves for conducting vertical wave motion from the body of the water to the float means.

Preferably the turbine means is formed to have an outside periphery and a central axis with a plurality of turbine vanes located in an array and each radially projecting on the turbine means between the periphery and the central axis. Further, the turbine means can include vane support means for supporting the vanes and a vane positioning means for positioning the vanes on the vane support means. Each of the vanes preferably is formed in cross section to have a leading edge and a tailing edge with each of the vanes mounted on the vane support means in a position orienting its leading edge in a constant direction and in a first position to located its trailing edge horizontal above its leading edge and in a second position to locate its trailing edge horizontal below its leading edge. The positioning means is operatively associated with the turbine vanes for maintaining the vanes in the first position in response to movement of the turbine means relative to the liquid in one of the downward or upward direction and for maintaining the vanes in a second position in response to movement of the turbine vanes relative to the liquid in the other of the downward or upward direction whereby movement of the turbine means relative to the liquid in both the downward and the upward directions results in the rotation of the turbine means in a constant direction.

BRIEF DESCRIPTION OF THE DRAWINGS

This invention will be better understood when taken in conjunction with the drawings wherein:

FIG. 2 is a fragmentary isometric view of a portion of the turbine of the device of FIG. 1;

FIG. 6 is an elevational view in partial section of an alternate wave energy harvesting device of the invention; and FIG. 7 is a fragmentary elevational view in section of a seal utilized in the device of FIG. 6.

This invention utilizes certain principles and/or concepts as are set forth in the claims appended hereto. Those skilled in the arts to which this invention pertains will realize that these principles and/or concepts are capable of being utilized in a variety of embodiments which may differ from the exact embodiments utilized for illustrative purposes herein. For this reason this invention is not to be construed as being limited solely to the illustrative embodiments, but is only to be construed in view of the claims.

DETAILED DESCRIPTION

In my prior U.S. Pat. No. 4,462,211, I describe a wave energy harvesting device which utilizes two counter rotating cylinders axially positioned with respect to one another. Located in the interiors of each of these counter rotating cylinders is a turbine. The turbine of each of the cylinders has a set of vanes each individually pivoted on an axle or spindle. Outboard of each of the vanes is an upper and a lower retaining ring, which inhibit the amount of pivotal movement of the vanes on the spindles or axles.

When water flows through the cylinders in a first direction the vanes pivot and are retained by the upper ring, and when water flows through the cylinders in the opposite direction the vanes pivot in the opposite direction and are now retained by the lower rings.

The pivoting vane principle of my U.S. Pat. No. 4,462,211 is incorporated in the wave energy harvesting device of this invention. Contrary to my prior U.S. Pat. No. 4,452,211, counter rotating cylinders are not used and thus the necessity of having two counter rotating turbines is not needed. For the wave energy harvesting device of this invention a single turbine is utilized which incorporates pivoting vanes interacting against upper and lower rings as is described in my prior U.S. Pat. No. 4,462,211. This is as is described in FIG. 2, below. For this reason the entire contents of my U.S. Pat. No. 4,462,211 are herein incorporated by reference.

Figure 1:
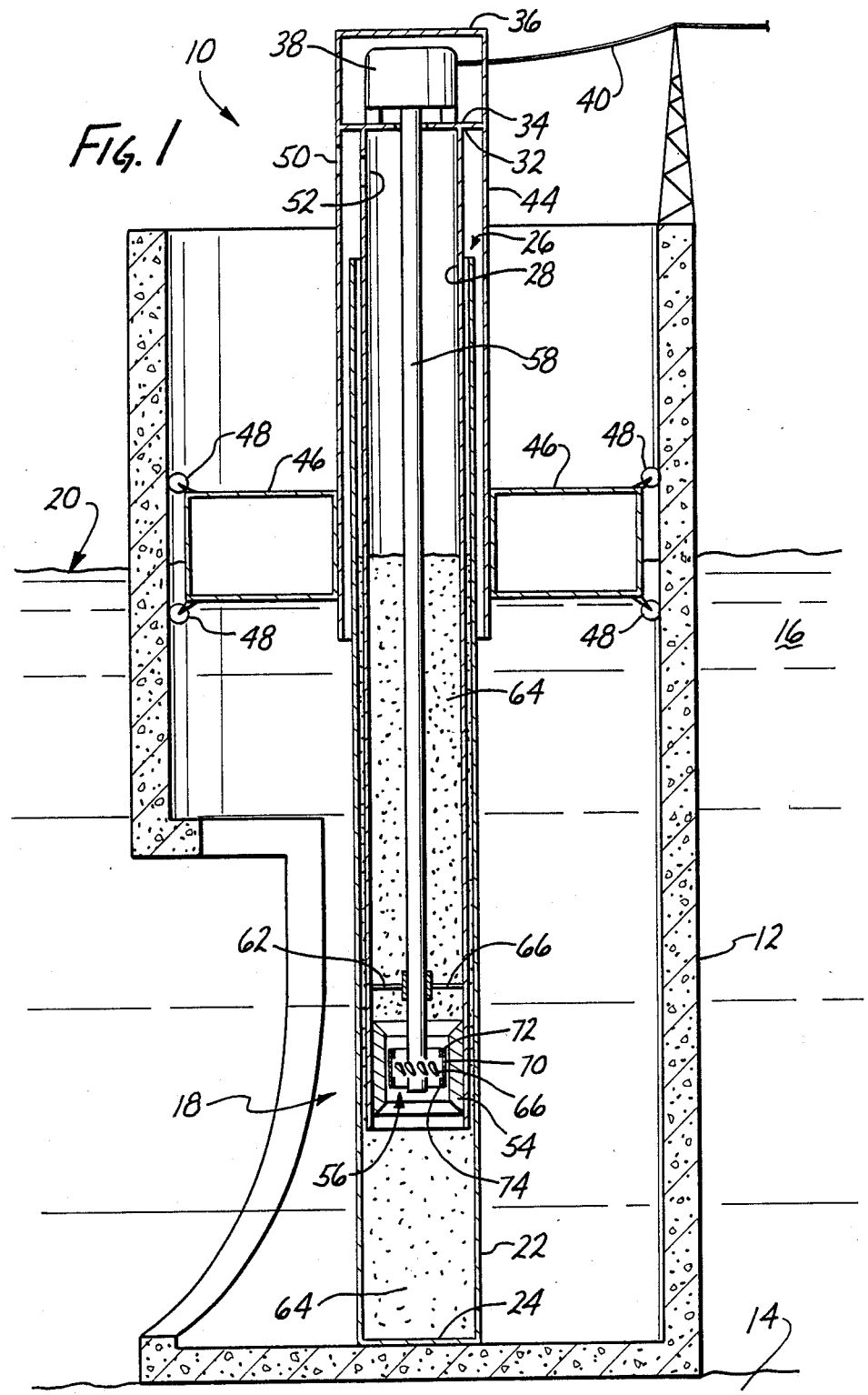
FIG. 1 is an elevational view in cross section of a wave energy harvesting device of the invention.

FIG. 1 illustrates a preferred embodiment of a wave energy harvesting device of the invention. Shown in FIG. 1 is a wave harvesting device 10. As seen if FIG. 1, the device 10 is not shown to scale, it being distorted to accentuate the horizontal with respect to the vertical for purposes of illustration of operation of certain of its components.

In FIG. 1 an outer protective casing 12 is located on the floor 14 of a body of water 16. For the purposes of illustration it will be considered that the body of water 16 represents shallow water just off shore of an ocean, sea, lake or other such large body of water.

One of outer casing 12's functions is to protect other components of the device 10 from horizontal wave action while still allowing for exposure of the components of the device 10 to vertical wave action. The outer casing 12 includes an opening 18 located below the surface 20 of the body of water 16. As such the opening 18 is a sub-surface opening. The opening 18 serves to allow for propagation of the vertical component of a wave into the interior of the casing 18, but since the casing 18 is solid at the surface 20 of the body of water 16, it inhibits transmission of horizontal components of a wave to the interior of the casing 12.

A further function of outer casing 12 is that of amplification of the energy available from a wave. As is discussed in Chapter 3 entitled "Wave Modification", of M. E. McCormick, *Ocean Wave Energy Conversion*, Wiley-Interscience Publication, John Wiley & Sons, 1981, the energy of a standing wave of height $H_r$ is twice that of the incident wave of height H since the energy of the standing wave is the sum of the energies of the incident wave and the reflected wave. Within the confines of the outer casing 12 not only is the device 10 subject to the incident wave but since the wave (or at least its vertical component) is contained within the casing 12 at least some of the energy of the reflected wave is available to further supply energy to the device 10.

Positioned within the interior of the casing 12 is a vertical tube 22. The vertical tube 22 is closed at its lower bottom end 24, however it is open about its upper or top end 26.

Positioned within the vertical tube 22 is a turbine tube 28. The turbine tube 28 is open about its bottom end 30 with its top end 32 capped off with a top wall 34. Positioned over the top wall 34 is a generator housing 36 having a generator 38 located therein. An electrical conduit 40 leads from the generator 38 to a support structure 42 located on the outer casing 12 and from there to an appropriate transmission line located on the shore of the body of the water 16 adjacent to the device 10.

The device 10 would be typically of a dimension such that it could conveniently be positioned in "shallow" water near the shore of the body of water 16, as for instance, in water from about 20 to about 50 feet deep. Alternatively to locating the device 10 within the casing 12 it could be appropriately suspended on piers, oil rigs or the like. If suspended off of a rig in deep water, the bottom end 32 of the tube 22 would not rest on the ocean or lake bottom but would be suspended near the surface.

A float tube 44 attaches to the top wall 34 concentric with the turbine tube 28. An appropriate float 46 is joined to the exterior of the float tube 44 distal from the top wall 34. The float is formed as a hollow toroid shaped structure (a ring or annulus having a hole in the middle) such that the float 46 surrounds the float tube 44, the vertical tube 22 and the turbine tube 28. Rollers collectively identified by the numeral 48 are preferably positioned in a spaced array around the float 46 for guiding the float 46 against the interior walls of the outer casing 12.

In response to waves along the surface 20 of the body of the water 16, the float 46 rises and falls within the outer casing 12. The vertical tube 22 is fixed with respect to the casing 12 and remains stationary, however, since the turbine tube 28 is attached via the top wall 34 to the float tube 44, the turbine tube 28 rises and falls within the interior of the vertical tube 22 in response to motion imparted to the float 46 by waves in the body of water 16.

Preferably the turbine tube 28, the vertical tube 22 and the float tube 44 are formed as surfaces of rotation. The simplest of these would be as elongated cylinders having circular cross sections. This geometry provides for both maximizing of structural integrity of the individual tubes 22, 28 and 44 while minimizing surface area and as such material usage and thus contributes to economy of construction of the device 10.

The diameter and the wall thickness of the vertical tube 22 and the turbine tube 28 are chosen such that a small gap on the order of a fraction of an inch (normally from about ⅛ to about ½ inch) exists between the tubes 22 and 28. Portions of this gap will be filled with a liquid as will be described below, essentially forming a liquid barrier between the tubes 22 and 28 which serves in part as a lubricated surface for relative movement of the tube 28 with respect to the tube 22 and for creating a "gap head" between the tubes 22 and 28.

Since the tubes 22 and 28 have the same geometry in cross section, i.e. both are preferably circles in cross section, the tube 28 can essentially telescope in and out of the tube 22 in response to wave movement on the body of water 16.

The tube 44 is telescoped over the tube 22 in essentially the same manner except typically the gap between the tube 44 and the tube 22 is essentially non critical and will be larger than the gap than between the tubes 22 and 28. Along with a further function described below vents 50 and 52 in the tubes 44 and 28 allow for equalization of pressure between the ambient and the interior of the turbine tube 28.

A choke annulus 54 having beveled openings is placed near the bottom of the turbine tube 28 and connects to the turbine tube 28. The choke annulus 54 is use to throttle liquid movement through the bottom of the turbine tube 28 to increase the velocity of liquid movement through this tube. A turbine 56 is located within the interior of the choke annulus 54. A transmission shaft 58 serves to transfer rotation from the turbine 56 to the generator 38 for rotation of the generator 38 in response to rotation of the turbine 56. A bearing 60 suspended on a spider 62 suspends the shaft 58 and the turbine 56 connected thereto centered within the choke annulus 54.

A liquid 64 is located within the lower portion of the vertical tube 26 and the turbine tube 28. A portion of the liquid 64 is located within the turbine tube 44 above the turbine 56 and extending through the turbine 56 to the bottom end 30 of the turbine tube 28. A further portion of the liquid 64 is located outside of the turbine tube 28, but within the interior of the vertical tube 22 between the walls of the vertical tube 22 and the turbine tube 28 with the remainder of the liquid 64 within the vertical tube 22 below the bottom end 30 of the turbine tube 28.

The turbine 56 is made up of a plurality of vanes, collectively identified by the numeral 66, which are suspended on support rods, collectively identified by the numeral 68, best seen in FIG. 2. The support rods 68 extend from the transmission shaft 58 to a peripheral ring 70. Located on the peripheral ring 70 is an upper stop ring 72 and lower stop ring 74. For the purposes of this invention, the rods 68 and the rings 70 represent a vane support means and the rings 72 and 74 represent a vane positioning means.

In FIG. 2 in response to downward relative movement of the turbine components with respect to a liquid they might be suspended in, the liquid pushes against the vanes 66 tilting their following edges, collectively identified by the numeral 76, upward with respect to their leading edges, collectively identified by the numeral 78. Continued relative movement of the turbine with respect to the liquid would impart a clockwise torque to the components as seen in FIG. 2. Contact of the tailing edges 76 against the upper ring 72 limits the rotation of the vanes 66 about the support rods 68 to give a proper pitch to the vanes 66 to achieve the clockwise rotation.

If the turbine of FIG. 2 now is moved in the opposite direction relative to the liquid, impingement of the liquid against the vanes 66 rotates the vanes 66 about the rods 68 such that the tailing edges 76 are now depressed with respect to the leading edges 78. The tailing edges are depressed until they contact the lower stop ring 74 positioning the turbine vanes in the position as shown in phantom line for the turbine vane 66-A. Even though relative movement of the turbine with respect to the liquid had been reversed since the vanes 66 have rotated on the support rods 68 the thrust imparted to the turbine vane 66 is still clockwise. Thus the turbine is still rotated clockwise irrespective of relative movement of the turbine with respect to the liquid, whether it is up or whether it is down. This is as is discussed in greater detail in my above referred to U.S. Pat. No. 4,462,211.

Referring back to FIG. 1, in response to a rising crest on a wave, vertical motion of the wave is transmitted via the opening 18 in the outer casing 12 to the float 46. This raises the float and in turn raises the float tube 44 and the turbine tube 28 with respect to the vertical tube 22. The turbine 56, while free to rotate within the turbine tube 28 is, in fact, fixed relative to vertical motion of the turbine tube 28 and moves vertically in conjunction with the turbine tube 28. This is because the generator 38 is attached to the top wall 34 and since the transmission shaft 58 connects the turbine 56 to the generator 38, the turbine 56 moves upwardly and downwardly in concert with movement of the transmission shaft 58 upwardly and downwardly. Motion of the turbine tube 28 upwardly and downwardly in response to wave action thus moves the turbine 56 relative to the liquid 64.

The turbine tube 28 and the turbine 56 located near its open lower end in essence can be considered as "a piston" which is located within "a cylinder", i.e. the vertical tube 22. This so-called piston, however, is not imperforate in the normal sense of a piston. It contains an opening, i.e. the opening through vanes of the turbine 56. Additionally the seal between this so-called piston, that is the outer wall of the turbine tube 28, and its so-called cylinder, that is the inner wall of the vertical tube 22, is not fluid tight. An appropriate space exists between the outer wall of the turbine tube 28 and the inner wall of the vertical tube 22. This space is occupied by a portion of the liquid 64.

For illustrations sake, assuming that the device 10 of FIG. 1 is located in an area wherein seasonal variations between the highest high tide and the lowest low tide is about 7 feet and wherein the waves of the surface of the body of the water normally vary up to 6 feet. In such a situation the so-called piston, i.e. the turbine tube 28 and the turbine 56 attached thereto, move relative to the so-called cylinder, i.e. the vertical tube 22, through maximum displacement of about 13 feet.

If the device 10 is sized to utilize a tube whose outer diameter is 36 inches for the turbine tube 28 and a tube whose inner diameter is 36.25 inches for the vertical tube 22, an imperfect seal will be formed between the so-called piston and its cylinder. This imperfect seal corresponds to the gap of 0.125 inches between the internal wall of the vertical tube 22 and the external wall of the turbine tube 28.

In tubes of the size described in the previous paragraph the gap, i.e. 0.125 inches, represents a tolerance easily maintained during manufacture of the tubes 22 and 28 using standard tube manufacturing techniques. Attempts to form better seals (tolerance on the order of 0.01 inches or better) similar to the pistons and cylinders of an internal combustion or large steam engine and at the same time allowing for a stroke of 13 feet would represent phenomenal manufacturing and machining requirements in constructing a suitably sized device 10. However, a tolerance of 0.125 inches for a 36 inch diameter pipe is easily maintained using normal tube fabrication practices. Thus the tubes 22 and 28 are easily and economically constructed. As will discussed below, even larger gaps between the tubes are inherently accommodated in larger diameter tubes for wave harvesters of the invention.

The cross sectional area of the 36 inch diameter turbine tube 28 is about 1018 square inches, whereas the area of the 0.125 inch gap between the tubes 22 and 28 represents only 14 square inches (approximately the area of a 4.25 diameter inch pipe. It is thus evident that the ratio of the cross sectional area of the turbine tube 28 with respect to the gap between the tubes 22 and 28 is very large. In this instance being greater than 72 to 1.

Assuming that there is no initial fluid flow through the turbine 58, with a gap of 0.125 inches between the tubes 22 and 28, about a two inch (theoretically 1.85 inches) movement of the float 46 raises and lowers the liquid level in the gap between the tubes 22 and 28 by about 11 to 12 feet (theoretically 11.25 feet for a 0.125 inch gap) imposing a pressure differential across the turbine 56 of about 5.3 psi or 763 pounds per square foot. For a 1.33 foot diameter turbine positioned in an appropriately sized choke annulus 54 in a pipe of a diameter of about 36 inches a flow rate through the turbine of about 28 feet per second at about 5 psi results in the production of about 10 kilowatts (KW) output (assuming 50% efficiency). The flow rate of about 28 feet per second requires an average rise or all rate of the float of about 1 foot per second which is typically available even in relatively calm seas. With a turbine pressure of 5 psi the load on the float is about 5090 pounds. To achieve this load typically a float diameter for a 10 KW device having 36 inch turbine pipe 28 would be selected to be about 20 feet.

For the above referenced tubes of approximately 36 inch diameter a gap of 0.125 inches between the turbine tube 28 and the vertical tube 22 results in a gap area of 14 inches$^2$ or 0.097 ft$^2$ resulting in the above referenced 72:1 ratio of the turbine tube cross section area to the gap cross section area. If this gap were increased to 0.25 inches the gap area increase to 0.196 ft$^2$. If the gap were further increased to 0.5 inches the gap area is now 0.397 ft$^2$. The ratio of a 0.5 inch gap to the turbine tube cross section area is now 17:1 (or approximately 15:1).

To achieve a 11 to 12 foot gap head with a gap width of 0.5 inches in a 36 inch diameter tube the float travel (with a 20 foot float) is 7.58 inches. In a sea with 2 foot waves this represents about 25% of the float travel. While I do not wish to be bound by theory, it is considered that at about a 15:1 ratio of turbine tube area to gap width area, in small seas (wave of about 2 feet in height) the efficiency of the device starts to diminished thus suggesting limiting any further increase of the gap width.

For a wave harvesting device of invention having a greater power output the diameter of the vertical tube 22 and the turbine tube 28 can be increased to accommodate a larger turbine. Alternately a larger float used in conjunction with a greater gap height can achieve higher turbine pressures to increase power output.

Again while I do not wish to be bound by theory, if larger diameter tubes are utilized, since such larger tubes inherently have greater cross sectional areas this allows the cross section area of the area between the tubes 22 and 28 to also be increase while still maintaining an appropriate ratio between the areas of the turbine and the gap area. Thus for larger diameter tubes the gap width between the tubes might be increased beyond the above noted 0.5 inches gap width. This would serve to facilitate the manufacture of such larger tubes without sacrificing performance of the device 10.

Normally in tubes of diameters from about 3 feet to about 6 feet the above referenced gap width of from 0.125 inches to 0.5 inches can be accommodated without losing an undue amount of float travel to achieve the height of the gap head liquid necessary to achieve a working pressure differential across the turbine 58.

Irrespective of the gap width some of the float travel necessary to achieve the height of the gap head required to create the turbine working pressure differentially will be recovered upon reversal of the direction of travel of the float as the crests and troughs of the waves move under it. However, since some of the float travel stored as potential energy in the gap head is lost to friction and to pivoting of the vanes 66, a working compromise between ease (and thus cost) of manufacture and float efficiency is selected. Normally a ratio of the area of the turbine to the gap area of at least 15:1 is desirable with a more preferred ratio being 70:1 or greater.

Figure 5:
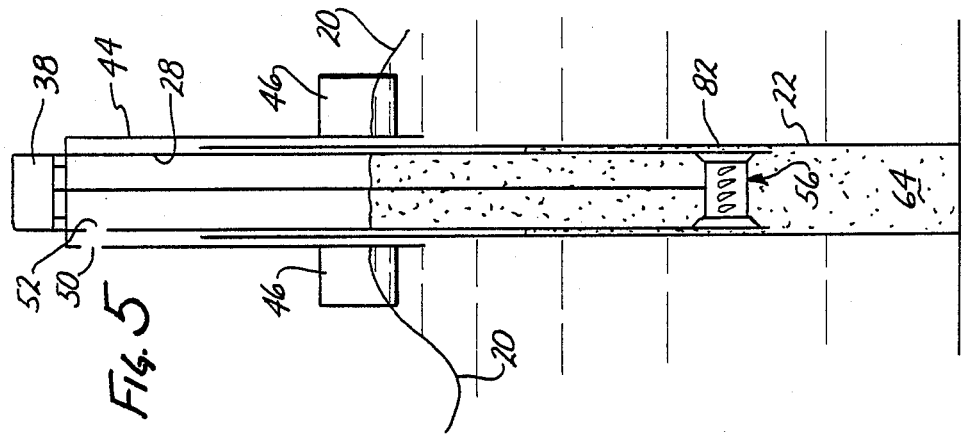
FIGS. 3, 4 and 5 are schematic elevational views of the operation of the wave energy harvesting device of the FIG. 1.
Figure 4:
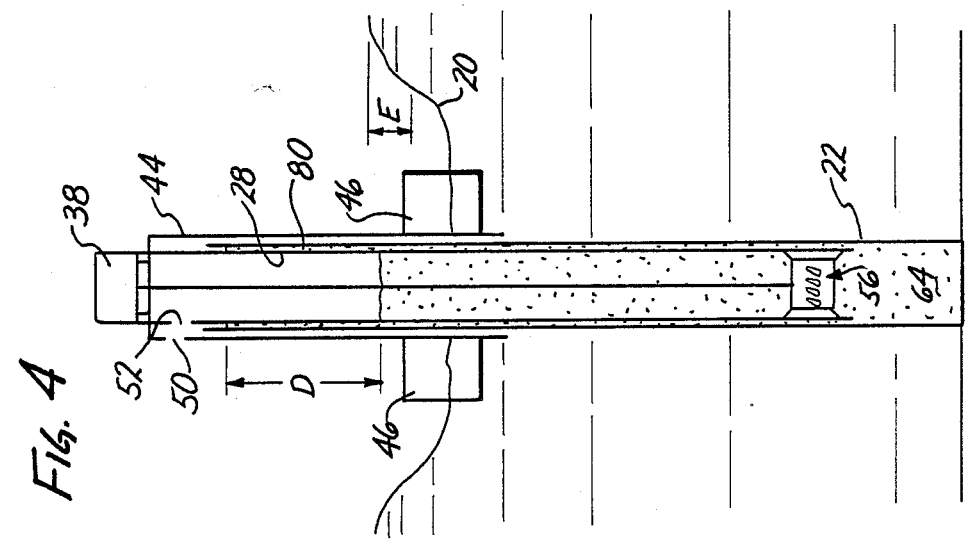
Figure 3:
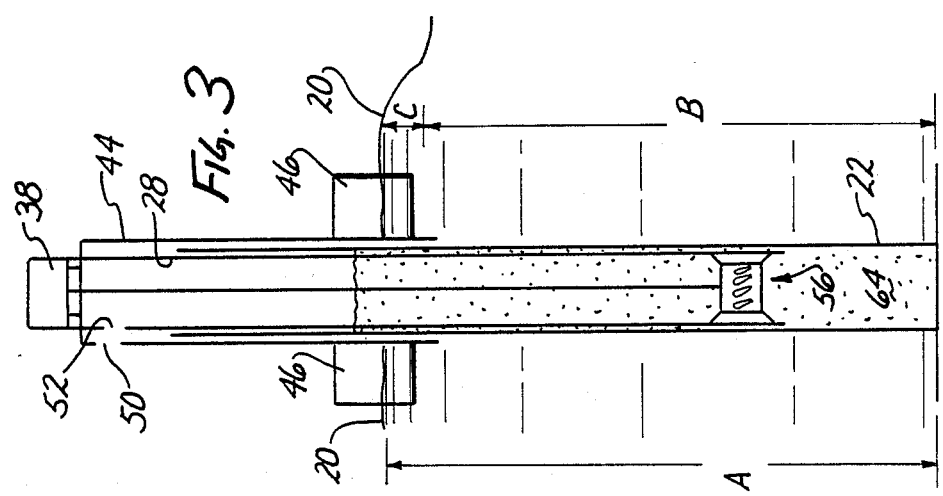

FIGS. 3 through 5 show a schematic representation of the operation of the device 10 of FIG. 1. For FIGS. 3 through 5 the mechanical features or the device of FIG. 1 are simplified into essentially line drawings for illustration of the operation of the device with the gaps between the respective tubes 22, 28 and 44 significantly enlarged such that fluid levels between the tubes 22 and 28 are more easily discerned. Even though the devices of FIGS. 3 through 5 are only representational of the device of FIG. 1, like numerals are utilized to identify like parts for consistency of understanding of the invention.

Further, with respect to FIGS. 3 through 5, the effect of the tide has been neglected and only the effect of a wave is considered. It is, of course, understood that the devices of FIGS. 3 through 5 as well as the device of FIG. 1 would be constructed of a sufficient height to account for tidal variations, thus the example above wherein a 7 foot tide was added to a 6 foot wave, the combined water movement of 13 feet could adequately be accommodated utilizing a device of about 30 feet in length. A device of this length would also extend above the mean high tide and high wave level of the surface of the water a sufficient amount (of from about 10 to 15 feet) to accommodate an extra ordinary storm wave occurring at maximum high tide while still allowing for sufficient water depth between the bottom most position of the float and the floor of the body of the water at the lowest tide level encountered at the trough of the wave.

In FIG. 3 a mean situation is illustrated. The float 46 is suspended on the surface of the water. The depth of the water is illustrated by the line A. In moving from FIG. 3 to FIG. 4, a 6 foot wave is now traveling under the float 46. The crest of this 6 foot wave would be 3 feet above the mean water level of FIG. 3 and its trough 3 feet below this means water level. At the position shown in FIG. 4, the float 46 is in the trough of this wave and thus the float 46 is suspended at a distance 3 feet below the water level A of FIG. 3. The water level thus has dropped to the level illustrated by line B with the float displaced a distance 3 feet as is illustrated by the line C As the float 46 descends in the trough of the wave, the float 46 sinks and no longer supports the tubes 44 and 28 and the structures attached to the tubes 28, i.e. the turbine 56 and electrical generator 40. Assuming that there is initially no water flow through the turbine 56 as the turbine 56 descends downwardly in the liquid 64, the liquid 64 is pushed up between the tubes 22 and 28 forming a gap head liquid column 80. The liquid column 80 is at a gap head height illustrated by line D.

For a 36 inch turbine pipe having a gap width of 0.125 inches, at a gap head height of about 11 to 12 feet the weight of liquid in the gap head creates an essentially 5 psi pressure differential across the turbine 56. This pressure is sufficient to rotate the turbine as it moves relative to the liquid. At this pressure the turbine spin rate is sufficient to generate 10 kilowatts of output power. Until such time as the float "bottoms out" in the trough of the wave the turbine 56 moves relative to the liquid 64 maintaining the gap head and its resulting turbine pressure differential sufficient to spin the turbine.

At the bottom of the wave trough, the turbine reaches its point of maximum decent, stops and then reverses direction. As the turbine stops its ascent the liquid stored in the gap head back flushes through the turbine. In conjunction with the float being lifted out of the way trough the turbine reverses direction. Concurrent with the turbine starting its ascent the gap head reverses displacement directions and descends below the level of the liquid 64 in the device 10.

FIG. 5 illustrates the situation wherein the wave crest has now moved underneath the float 46 and the float 46 is lifted a distance E above the mean water level of FIG. 3. In response to movement of the float from the wave trough to the wave crest the turbine 56 is urged upwardly through the liquid 64 creating a low pressure area between the tubes 22 and 28 forming a gap head liquid column illustrated by numeral 82. The column 82 is displaced below the mean surface level illustrated in FIG. 3 at about 11 to 12 feet again creating a pressure differential across the turbine 56 of about 5 psi. In a like manner to the turbine decent, as the turbine 56 moves upwardly relative to the liquid 64 the pressure is sufficient to spin the turbine and create an energy output.

For the 3 foot diameter device discussed above having a 20 foot diameter float the approximately 5 psi pressure differential across the turbine 56 creates a flow velocity of approximately 27 feet per second in response to a float movement of about one foot per second. A float movement of one foot per second is easily achieved in typical moderate waves, as for instance waves of approximately 2 to 6 foot between their crests and their troughs.

The liquid 64 can be the same liquid as the liquid of the body of the water or alternately it can be a different liquid. Since sea water is corrosive in the long term, use of fresh water or other non-corrosive liquid for the liquid 64 can be used with the device 10. Other than water, suitable for the liquid 64 are various oils. A typical liquid might include cotton seed oil which is of a density approximate that of sea water, is relatively abundant and is readily available.

For a three foot diameter device 10 discussed with respect to FIG. 1 the volume of the liquid necessary would be equivalent to about 20 barrels. The use of an oil, as for instance cotton seed oil, has many advantages including acting as a natural lubricant between the tubes 22 and 28 as well as for the components of the turbine 56.

In an extra ordinary situation wherein a very energetic wave was encountered, the crest of the wave could lift the float 46 and the turbine tube connected thereto very rapidly such that the gap head liquid column 82 of FIG. 5 could descend below the bottom end 30 of the turbine tube 28. Air would then be drawn in from the ambient environment via the opening 50 and would harmlessly bubble up through the turbine 56 and enter the space within the turbine tube 28 above the level of the liquid 64.

Conversely, if the trough of an extra ordinary large storm wave passed across the device depressing the float 46 and significantly increasing the height of the gap head liquid column 80, when this height reached the level of the opening 52, the working liquid 64 would spill back into the interior of the turbine tube 28 via the opening 52. Since the top of the wall of the vertical tube 22 would now be positioned between the openings 50 and 52 and would represent a higher barrier for the liquid 64 than the opening 62 the liquid 64 would not be lost to the body of water 16.

In response to upward and downward movement of the float 46 the turbine is moved up and down through the liquid 46. A portion of the float's movement is utilized to create the gap head. In creating the gap head the level of the surface of the liquid 64 within the interior of the tube 28 is slightly elevated or depressed. The remainder of the float's movement while moving the turbine 56 through the liquid 64 to rotate the turbine also moves the remainder of the tube 28 and its attached top 34. This serves to expand and contract the volume of the space within the interior of the tube 28 above the surface level of the liquid 64. This in essence pumps air into and out of the opening 50 and 52. Harvesting of this air movement, i.e. the kinetic energy of the moving air, could also be accomplished by locating an air turbine (not shown or identified in the drawings) at the vent 52.

While the air movement is considered secondary to the movement of the turbine 58 relative to the liquid 64 because of the compressibility of a gas compared to the incompressibility of the liquid 64, if desired the device 10 of the invention could harvest energy from both of the fluids it contains, its liquid 64 and its interior air.

Referring to FIG. 6 a further embodiment of the invention is shown. In the device 84 of FIG. 6 a float 86 is attached to the top of a turbine tube 88. The turbine tube 88 is telescoped within a vertical tube 90. Contrary to the embodiment of FIG. 1, a seal 92 is formed between the turbine tube 88 and the vertical tube 90.

In the embodiment of FIG. 6 the liquid of the body of water 94 is utilized as the working liquid within the turbine tube 88. Openings 96 are provided below the float 86. The openings 94 allow fluid movement from the body of water 94 to the interior of the turbine tube 88 A turbine 98 is located within the turbine tube 88 and is connected to generator a 100 via a transmission shaft 102.

FIG. 7 illustrates details of the seal 92 of FIG. 6. The seal 92 includes a seal body 104 attached to the vertical tube 90. An upper lip seal 106 is attached to the seal body 104 and extends around the turbine tube 88. In a like manner a lower lip seal 108 is attached to the seal body 104 and also extends around the turbine tube 88.

The base 110 of the upper lip seal 106 and the base 112 of the lower lip seal 108 are positioned or oriented toward one another with the lip 114 of the upper lip seal 106 and the lip 116 of the lower lip seal 108 oriented away from one another. The lips 114 and 116 seal against the turbine tube 88.

In reference now to both FIGS. 6 and 7, when the wave supporting the float 86 drops such that the float 86 is no longer supported by it, the turbine tube 88 telescopes down into the vertical tube 90. This transmits pressure to the fluid 118 within the interior of the tubes 88 and 90. Pressurization of the fluid 118 causes the portion of the fluid 118 between the tubes 88 and 90 to compress the lower lip seal body 108 against the turbine tube 88. This seals the turbine tube 88 to the vertical tube 90 such that continued telescoping of the turbine tube 88 into the vertical tube 90 requires that the turbine pass through the incompressible fluid 118 rotating the turbine 96. It is noted at this point, while the pressure in the fluid 118 might tend to invert the lower lip seal 108, the downward movement of the turbine tube 88 with respect to it counteracts this.

When the float 86 is raised by a wave crest this pulls the turbine tube 88 out of the vertical tube 90. This drops the pressure acting on the fluid 118. This tends to pull the lower lip seal 106 tightly against the turbine tube 88. In the same manner as the lip seal 108 was kept from inversion, upward movement of the turbine tube 88 counteracts any inversion of the seal 106 by the pressure external of it. Since the fluid 118 is sealed by the seal 106, additional fluid is drawn into the expanding interior of telescoping tubes 88 and 90 through the openings 96. As this fluid flows into the expanding interior of the telescoping tubes the turbine 98 passes through it rotating the turbine 98.

The turbine 98 is constructed as was the turbine 56 utilizing pivoting vanes which are positioned against upper and lower stop rings such that irrespective of whether or not the turbine tube 88 is telescoping in or out of the vertical tube 90, the turbine 98 rotates in a constant fixed direction.

I claim:

1. A device for harvesting wave energy comprising:
   a hollow vertical tube means having an open top and a closed bottom, said vertical tube means located in a body of water with its bottom located beneath said surface of said body of water;
   a hollow turbine tube means having a top and an open bottom, said turbine tube means sized and shaped with respect to said vertical tube means such that at least a portion of said turbine tube means including said open bottom of said turbine tube means is located in and is movable within said vertical tube means;
   a float means, said float means operatively connected to said turbine tube means for raising and lowering said turbine tube means with respect to said vertical tube means in response to wave motion of said body of water with at least said portion of said turbine tube means which is located in said vertical tube means being raised and lowered in said vertical tube means in response to said wave motion;
   a liquid contained in said vertical tube means, said liquid present in an amount to at least partially fill the interior of said vertical tube means from said bottom of said vertical tube means upwardly to a level at least above said open bottom of said turbine tube means with at least a portion of said liquid located within the interior of said turbine tube means above said open bottom of said turbine tube means; and
   a turbine means, said turbine means rotatable in response to relative movement with respect to a fluid, said turbine means located in said turbine tube means and connected to said turbine tube means to move with respect to said vertical tube means and fluid contained therein in conjunction with said raising and lowering of said turbine tube means in said vertical tube means whereby movement of said turbine means with respect to fluid contained in said vertical tube means rotates said turbine means.

2. A device of claim 1 wherein:
said top of said vertical tube means is located above said surface of said body of water.

3. A device of claim 1 including:
a further portion of said liquid being located between the outside of said turbine tube means and the inside of said vertical tube means.

4. A device of claim 1 including:
a seal means located between said vertical tube means and said turbine tube means, said seal means for inhibiting fluid movement between said vertical tube means and said turbine tube means.

5. A device of claim 4 wherein:
said seal means includes an upper lip seal means and a lower lip seal means each fixed to said vertical tube means and extending towards and movably sealing against said turbine tube means, each of said upper lip seal means and said lower lip seal means having a base and a lip, said base of said upper lip seal means and said base of said lower lip seal means oriented towards one another on said vertical tube means with said lip on the upper seal means and said lip on said lower seal means oriented away from one another and each sealing against said turbine tube means.

6. A device of claim 1 wherein:
said top of said turbine tube means includes a vent to the ambient environment for fluid flow between the ambient environment and the interior of said turbine tube means.

7. A device of claim 1 wherein:
said turbine means is located in said turbine tube means in a position between said open bottom of said turbine tube means and the level of said liquid in said turbine tube means.

8. A device of claim 7 wherein:
said turbine means is rotated by said liquid in response to movement of said turbine tube means and said turbine means attached thereto with respect to said vertical tube means and said liquid contained therein.

9. A device for harvesting wave energy comprising:
a hollow vertical tube having an open top and a closed bottom, said vertical tube located in a body of water with its bottom located beneath said surface of said body of water and its top located above said surface of said body of water;
a hollow turbine tube having an open top and an open bottom, said turbine tube sized and shaped with respect to said vertical tube such that a variable portion of said turbine tube including said open bottom of said turbine tube is located in and is movable within said vertical tube and the remaining portion of said turbine tube including said top of said turbine tube extends above said open top of said vertical tube;
a float means for raising and lowering said turbine tube with respect to said vertical tube in response to wave motion of said body of water, said float means operatively connected to said turbine tube proximal to said top of said turbine tube, said float means raising and lowering said turbine tube in said vertical tube in response to said wave motion to change said variable portion of said turbine tube which is located in said vertical tube;
a liquid, said liquid contained in and displaceable between said vertical tube and a lower portion of said turbine tube, said liquid present in an amount to at least partially fill the interior of said vertical tube and to at least partially fill the interior of said turbine tube from said bottom of said vertical tube upwardly to a level at least above said open bottom of said turbine tube irrespective of said portion of said turbine tube located in said vertical tube, at least a portion of said liquid located between the outside of said turbine tube and the inside of said vertical tube, a further portion of said liquid located within the interior of said turbine tube above said open bottom of said turbine tube and the remainder of said liquid located in said vertical tube below said bottom of said turbine tube; and
turbine means for rotating in response to relative movement with respect to a fluid, said turbine means located in and connected to said turbine tube in a position below said level of said liquid in said turbine tube, said turbine means moving through said liquid in response to movement of said turbine tube with respect to said vertical tube, said movement of said turbine means through said liquid rotating said turbine means.

10. A device of claim 9 wherein:
said float means includes a float tube, said float tube attaching to the top of said turbine tube and sized and shaped to extend outwardly from and surround at least that portion of said vertical tube which extends above said surface of said body of water.

11. A device of claim 10 wherein:
said float means further includes a float, said float shaped as an at least partially hollow toroid-like body encircling said vertical tube and said turbine tube, said float attaching to said float tube distal from the attachment of said float tube to said turbine tube.

12. A device of claim 9 wherein:
each of said vertical tube and said turbine tube are formed in cross section as surfaces of rotation with said turbine tube telescoped within said vertical tube.

13. A device of claim 12 wherein:
each of said vertical tube and said turbine tube are round in cross section.

14. A device of claim 12 wherein:
the ratio of the cross sectional area of interior of said turbine tube is at least 15:1 compared to the cross section area of the area between the inside surface of said vertical tube and the outside surface of said turbine tube.

15. A device of claim 14 wherein:
said ratio is at least 70:1.

16. A device of claim 9 further including:
generator means for generating an electrical current in response to rotation, said generator means located on said top of said turbine tube; and
transfer means for transferring rotational motion from said turbine means to said generator means, said transfer means located within said turbine tube and operatively connected to both said turbine means and said generator means, said transfer means rotated with respect to rotation of said turbine means and in turn said transfer means rotating said generator means.

17. A device of claim 9 including:
an external tube, said external tube located in said body of water and sized and shaped to at least partially contain and protect said vertical tube, said turbine tube and said float means from horizontal wave motion;
said external tube having a top located above said surface of said body of water; and
said external tube having a sub-surface opening located below said surface of said body of water, said sub-surface opening for conducting vertical wave motion from said body of water to said float means.

18. A device of claim 9 wherein:
said turbine means has an outside periphery and a central axis;
said turbine means including a plurality of turbine vanes located in an array with each of the vanes mounted on and radially projecting on said turbine means between said periphery and said central axis.

19. A device of claim 18 wherein:
said turbine means includes a vane support means for supporting said vanes; and
said turbine means further includes a vane positioning means for positioning said vanes on said vane support means.

20. A device of claim 19 wherein:
each of said vanes in cross section has a leading edge and a trailing edge, each of said vanes mounted on said vane support means in a position orienting its said leading edge in a constant direction and in a first position to locate its said trailing edge horizontally above its said leading edge and in a second position to locate its said trailing edge horizontally below its said leading edge;
said positioning means operatively associated with said turbine vanes for maintaining said vanes in said first position in response to movement of said turbine means relative to said liquid in one of a downward or an upward direction and for maintaining said vanes in said second position in response to movement of said turbine means relative to said liquid in the other of said downward or upward direction whereby movement of said turbine means relative to said liquid in both said downward and said upward directions results in rotation of said turbine means in a constant direction.

21. A device of claim 9 wherein:
said liquid is a different liquid than the liquid of said body of water.

22. A device for harvesting wave energy comprising:
a first tube;
a second tube, said second tube concentric with and at least partially movably contained in said first tube, said second tube telescoping into and out of said first tube in response to movement of said second tube with respect to said first tube;
a liquid located in said first tube;
a wave powered float connect to said second tube for telescoping said second tube relative to said first tube; and
a turbine attached to said second tube in a position within said first tube, said turbine movable relative to said liquid in response to movement of said second tube relative to said first tube.

23. A device of claim 22 including:
a generator for generating an electrical current in response to rotation, said generator located in association with said second tube; and
transfer means for transferring rotational motion from said turbine to said generator, said transfer means operatively connected to both said turbine and said generator, said transfer means rotated with respect to rotation of said turbine and in turn said transfer means rotating said generator.

* * * * *